United States Patent
Anantharamaiah

(10) Patent No.: US 9,983,969 B2
(45) Date of Patent: May 29, 2018

(54) INTERFACE SWITCH FOR AUTOMATICALLY PERFORMING OPERATIONS IN AN EMBEDDED SYSTEM AND A METHOD THEREOF

(71) Applicant: Wipro Limited, Bangalore (IN)

(72) Inventor: Nonavinakere Nagendra Prasad Anantharamaiah, Bangalore (IN)

(73) Assignee: Wipro Limited, Bangalore (IN)

( * ) Notice: Subject to any disclaimer, the term of this patent is extended or adjusted under 35 U.S.C. 154(b) by 157 days.

(21) Appl. No.: 15/152,181

(22) Filed: May 11, 2016

(65) Prior Publication Data

US 2017/0286248 A1   Oct. 5, 2017

(30) Foreign Application Priority Data

Mar. 29, 2016  (IN) .............................. 201641010896

(51) Int. Cl.

| | | |
|---|---|---|
| G06F 13/00 | (2006.01) | |
| G06F 11/30 | (2006.01) | |
| G06F 13/40 | (2006.01) | |
| G06F 13/38 | (2006.01) | |
| G06F 3/06 | (2006.01) | |

(52) U.S. Cl.
CPC ...... *G06F 11/3013* (2013.01); *G06F 11/3051* (2013.01); *G06F 13/4022* (2013.01); *G06F 3/0601* (2013.01); *G06F 13/385* (2013.01)

(58) Field of Classification Search
None
See application file for complete search history.

(56) References Cited

U.S. PATENT DOCUMENTS

| | | | |
|---|---|---|---|
| 8,813,061 B2 | 8/2014 | Hoffman et al. | |
| 2007/0094378 A1* | 4/2007 | Baldwin | G06F 3/0601 |
| | | | 709/223 |
| 2015/0100633 A1 | 4/2015 | Barrett et al. | |

FOREIGN PATENT DOCUMENTS

| | | |
|---|---|---|
| CN | 202221451 U | 5/2012 |
| CN | 103617061 A | 3/2014 |

* cited by examiner

*Primary Examiner* — Henry Tsai
*Assistant Examiner* — Aurangzeb Hassan
(74) *Attorney, Agent, or Firm* — LeClairRyan PLLC

(57) ABSTRACT

The present disclosure relates to a device and a method for automatically performing one or more operations in an embedded system. The method comprises receiving by an interface switch, data related to one or more operations from automation system. Thereafter, the interface switch copies the data to a media storage device configured in the interface switch. Further, the interface switch mounts remotely the media storage device onto the embedded system. Upon mounting the media storage device, the interface switch facilitates access of a Human Machine Interface (HMI) and one or more configuration menus of the embedded system to the automation system. Finally, the interface switch performs the one or more operations automatically in the embedded system through the HMI and the one or more configuration menus. Upon performing the one or more operations, the media storage device is un-mounted from the embedded system and the embedded system is restarted.

12 Claims, 3 Drawing Sheets

INTERFACE SWITCH FOR AUTOMATICALLY PERFORMING OPERATIONS IN AN EMBEDDED SYSTEM AND A METHOD THEREOF

This application claims the benefit of India Patent Application Serial No. 201641010896, filed Mar. 29, 2016, which is hereby incorporated by reference in its entirety.

FIELD

The present subject matter is related, in general to embedded systems, and more particularly, but not exclusively to an interface switch and a method for automatically performing one or more operations in an embedded system.

BACKGROUND

An embedded system is a computer system with a dedicated function within a larger mechanical or electrical system, often with real-time computing constraints. The embedded system is embedded as part of a complete device often including hardware and mechanical parts. Generally, the embedded systems undergo a 'Product Development Life Cycle (PDLC)' spanning up to multiple years. In the PDLC process, there is a continuous need for software testing as the software builds should be validated and tested on a daily/weekly basis. Quick validation of new software releases is very critical and essential to ensure adherence of schedule of the PDLC process. Also, the embedded systems such as In-Vehicle Infotainment (IVI) systems may require media testing. Media testing may involve media device mounting, rendering of media content and playback of the media content. The automation of the process of media testing may save a lot of time as the user of the vehicle may not have to go to the dealer to perform media testing and validation of software upgrades. Thus, a PDLC cycle involves performing one or more operations on the embedded system.

Existing techniques provide several methods for upgrading software and validating latest software upgrades in the embedded systems and media testing separately. The existing techniques using a Universal Serial Bus (USB) Hub or a router provide only binary copying or transfer of data to the embedded system. In another technique, software components of a multimedia module in a vehicle may be automatically upgraded using a USB connector. However, the existing techniques facilitate performance of a singular operation using an USB interface installed in the embedded system. Further, the USB interface is not external to the embedded system, thereby limiting the performance of a plurality of operations simultaneously on the embedded system.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Disclosed herein are an interface switch and a method for automatically performing one or more operations in an embedded system. One or more operations to be performed on the embedded system are downloaded by an automation system which is interfaced with the interface switch. Data related to one or more operations are transferred to a media storage device which in turn mounts the data remotely to the embedded system through the interface switch.

Accordingly, the present disclosure relates to an interface switch for automatically performing one or more operations in an embedded system. The interface switch comprises a plurality of ports, at least one relay board and a controller board. The plurality of ports comprises one or more first ports, one or more intermediate ports and one or more second ports. The one or more first ports of the plurality of ports represented as input ports are configured to establish a first communication channel with an automation system. Further the one or more first ports receive data related to the one or more operations from the automation system through the first communication channel. One or more intermediate ports of the plurality of ports are interfaced with the one or more first ports. Each of the one or more intermediate ports is adapted to plug a media storage device for storing the data. One or more second ports of the plurality of ports represented as output ports are configured to establish a second communication channel with the embedded system. Further, the one or more second ports transmit the data to the embedded system through the second communication channel for performing the one or more operations in the embedded system. The at least one relay board comprises plurality of relays, wherein each of the plurality of relays is associated with each of the plurality of ports. Further, the controller board is configured to control operations of the plurality of ports through switching of the plurality of relays. The controller board facilitates access of Human Machine Interface (HMI) and one or more configuration menus of the embedded system to the automation system by executing one or more automation scripts.

Further, the present disclosure relates to a method for automatically performing one or more operations in an embedded system. The method comprises receiving by an interface switch, data related to the one or more operations from an automation system. Thereafter, the interface switch copies the data to a media storage device configured in the interface switch. Further, the interface switch mounts remotely the media storage device onto the embedded system. Upon mounting the media storage device, the interface switch facilitates an access of a Human Machine Interface (HMI) and one or more configuration menus of the embedded system to the automation system. Finally, the interface switch performs the one or more operations automatically in the embedded system through the HMI and the one or more configuration menus.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1A:
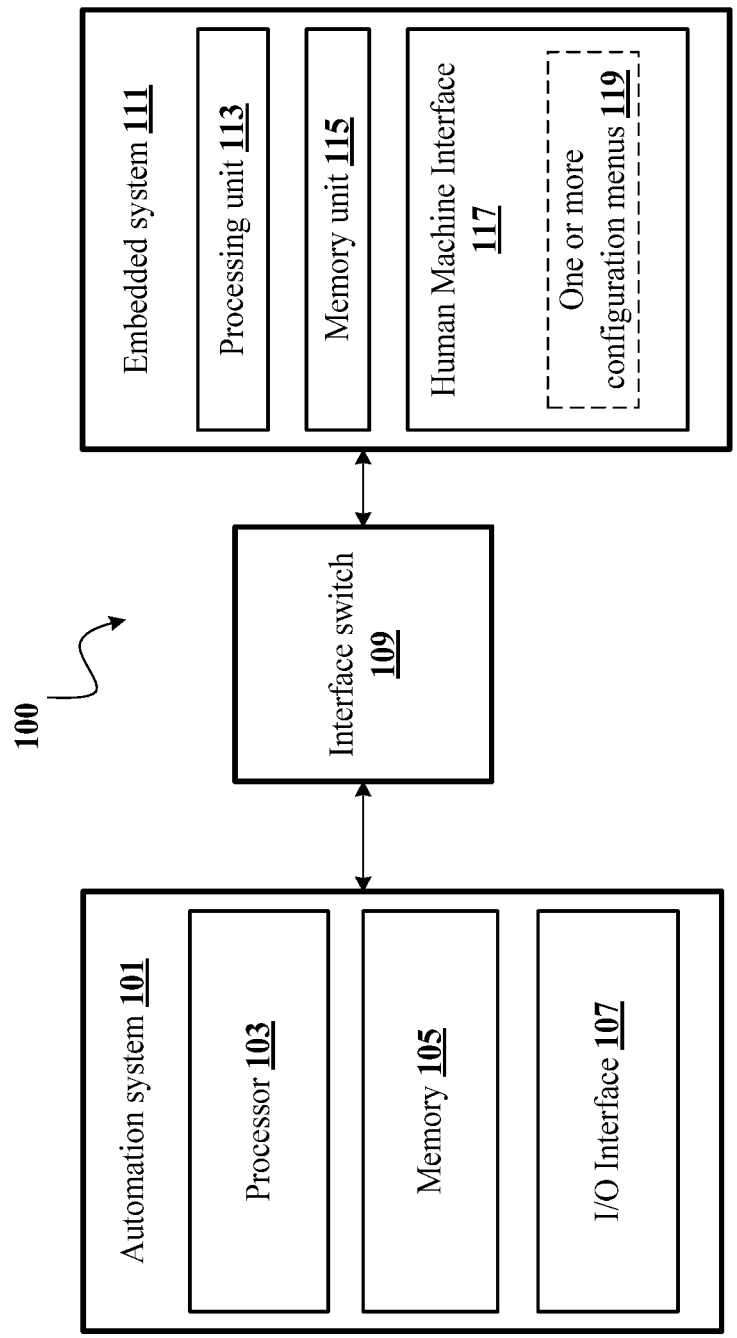
FIG. 1a shows an exemplary architecture for automatically performing one or more operations in an embedded system, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in one or more non-transitory computer readable media and executed by a computer, processor, computing device, or controller whether or not such device is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to an interface switch and a method for automatically performing one or more operations in an embedded system. The method comprises receiving by an interface switch, data related to the one or more operations from an automation system. Thereafter, the interface switch copies the data to a media storage device configured in the interface switch. Further, the interface switch mounts remotely the media storage device onto the embedded system. Upon mounting the media storage device, the interface switch facilitates an access of a Human Machine Interface (HMI) and one or more configuration menus of the embedded system to the automation system. Finally, the interface switch performs the one or more operations automatically in the embedded system through the HMI and the one or more configuration menus. Upon performing the one or more operations, the media storage device is un-mounted from the embedded system and the embedded system is restarted.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1a shows an exemplary architecture for automatically performing one or more operations in an embedded system, in accordance with some embodiments of the present disclosure.

The architecture 100 comprises an automation system 101, an interface switch 109 and an embedded system 111. In an embodiment, the automation system 101 may comprise a computing device associated with an automation tool. As an example, the computing device may include, but not limited to, a Personal Computer (PC), a laptop, a server etc. As an example, the embedded system 111 may be an In-Vehicle-Infotainment (IVI) system, a set top box, medical equipment, a mobile phone etc. The automation system 101 is connected to the interface switch 109 which in turn is connected to the embedded system 111. The automation system 101 may be connected to the embedded system 111 through a Local Area Network (LAN), Wi-Fi, or USB based connectivity.

The automation system 101 comprises a processor 103, a memory 105 and an I/O interface 107. The processor 103 is triggered to provide intimation when a latest version of one or more operations to be performed on the embedded system 111 is released. As an example, the one or more operations may include, but not limited to, upgrading of one or more applications in the embedded system 111 and testing of one or more applications in the embedded system 111. As an example, the application may be a media system. The processor 103 identifies the latest version upon receiving the trigger intimation and downloads the latest version comprising data related to the one or more operations. Upon downloading the data, the data is then stored in the memory 105. The processor 103 communicates with the interface switch 109 through the I/O interface 107 to transfer the data to the interface switch 109.

Upon receiving the data, the interface switch 109 copies the data to a media storage device configured in the interface switch 109. The interface switch 109 mounts remotely the media storage device onto the embedded system 111. The embedded system 111 comprises a processing unit 113, a memory unit 115 and a Human Machine Interface (HMI) 117. The HMI may comprise one or more configuration menus 119. In an embodiment, the HMI 117 is coupled to the processing unit 113. Upon mounting the media storage device on the embedded system 111, the data is stored in the memory unit 115. The interface switch 109 executes one or more automation scripts received from the automation system 101 to facilitate access of the HMI 117 and the one or more configuration menus 119 to the automation system 101. The data is authenticated through the access of HMI 117 of the embedded system 111. Upon authentication of the data, the automation system 101 performs the one or more operations automatically in the embedded system 111 through the HMI 117 and the one or more configuration menus 119. In an embodiment, the interface switch 109 may perform the one or more operations automatically in the embedded system 111 through the HMI 117 and the one or more configuration menus 119.

While performing the one or more operations, the automation system 101 monitors the one or more operations until their completion to ensure fail-safe performance of the one or more operations. If the one or more operations are performed successfully, the automation system 101 traverses out of the one or more configuration menus 119. Upon traversing out of the one or more configuration menus 119, the media storage device is remotely un-mounted from the embedded system 111. Further, the automation system 101 initiates restart of the embedded system 111 through the HMI 117. Upon restarting the embedded system 111, the automation system 101 accesses the latest version in the embedded system 111 to verify the proper functioning of the embedded system 111.

Figure 1B:
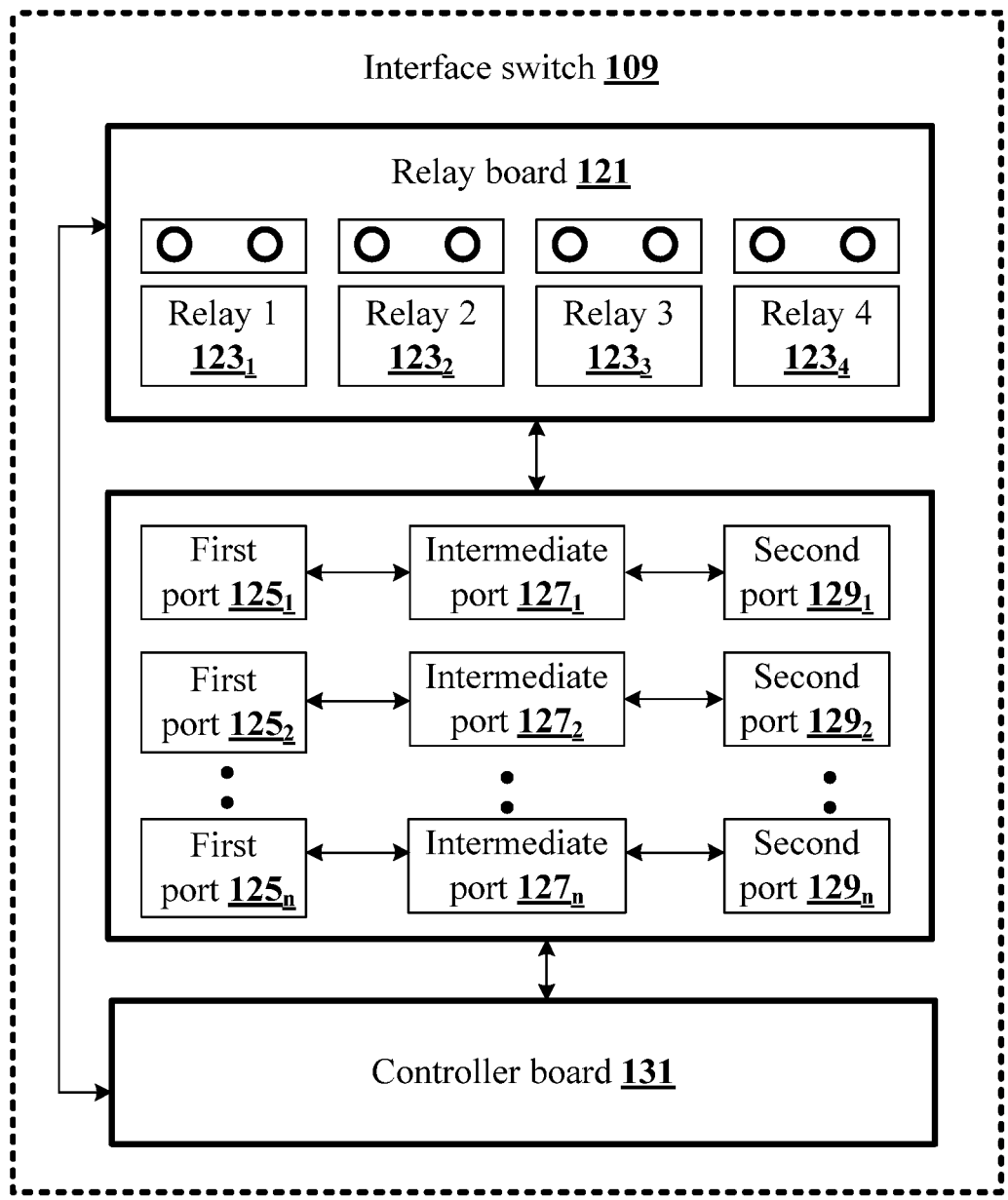
FIG. 1b shows a detailed architecture of an interface switch for automatically performing one or more operations in an embedded system in accordance with an exemplary embodiment of the present disclosure.

FIG. 1b shows a detailed architecture of an interface switch for automatically performing one or more operations in an embedded system in accordance with an exemplary embodiment of the present disclosure.

As an example, the interface switch 109 used in the present disclosure is a USB switch. It will be apparent to a person skilled in the art that various other interface switches may also be used in the present disclosure.

The interface switch 109 comprises a plurality of ports, at least one relay board 121 and a controller board 131. The plurality of ports consists of one or more first ports, first port 1251 to first port 125n (collectively referred to as one or more first ports 125), one or more intermediate ports, intermediate port 1271 intermediate port 127n (collectively referred to as one or more intermediate ports 127) and one or more second ports, second port 1291 to second port 129n (collectively referred to as one or more second ports 129). The at least one relay board 121 comprises plurality of relays, relay 1231 to relay 1234 (collectively referred to as plurality of relays 123). As an example, a 4-channel relay board is used in the present disclosure. In an embodiment, the interface switch 109 is powered by a power unit (not shown) configured in the interface switch 109.

The one or more first ports 125 of the plurality of ports are represented as input ports. The one or more first ports 125 are configured to establish a first communication channel with an automation system 101. Further, the one or more intermediate ports 127 of the plurality of ports are interfaced with the one or more first ports 125. The one or more first intermediate ports 127 are adapted for plugging a media storage device. As an example, the media storage device may include, but not limited to, a Universal Serial Bus (USB) device. Furthermore, the one or more second ports 129 of the plurality of ports are represented as output ports. The one or more second ports 129 are configured to establish a second communication channel with the embedded system 111. The controller board 131 is connected to the automation system 101 to receive one or more instructions to control operations of the interface switch 109. Further, each of the plurality of relays 123 configured in the at least one relay board 121 are associated with each of the plurality of ports. Each of the plurality of relays 123 comprise a Normally Open (NO) and Normally Close (NC) positions that are controlled using General Purpose Input/Output (GPIO) lines present in the controller board 131. By default, in the NC position, the GPIO lines between the automation system 101 and the one or more first ports 125 are closed that allows communication between the automation system 101 and the one or more first ports 125. Alternatively, in the NO position, the GPIO lines between the automation system 101 and the one or more first ports 125 are open to stop the communication between the automation system 101 and the one or more first ports 125. But simultaneously, the GPIO lines are closed between the one or more second ports 129 and the embedded system 111 that allows communication between the one or more second ports 129 and the embedded system 111.

The automation system 101 is triggered to provide intimation when a latest version for one or more operations to be performed on the embedded system 111 is released. As an example, the one or more operations may include, but not limited to, upgrading of one or more applications in the embedded system 111 and testing of one or more applications in the embedded system 111. The automation system 101 downloads the latest version comprising data related to the one or more operations and stores the data in the memory 105 of the automation system 101. Upon storing the data, the automation system 101 transfers the data to the interface switch 109 based on status of each of the plurality of relays 123. In an embodiment, the status of each of the plurality of relays 123 is at least one of "open" and "close". The automation system 101 transfers the data to the interface switch 109 when the status of each of the plurality of relays 123 associated with each of the one or more first ports 125 is "close" i.e. when each of the plurality of relays 123 associated with each of the one or more first ports 125 are controlled by the controller board 131 in such a way that, the GPIO lines between the automation system 101 and the one or more first ports 125 are closed. But at the same time, the GPIO lines between the one or more second ports 129 and the embedded system 111 are open.

The one or more first ports 125 receive the data from the automation system 101 using the first communication channel. Upon receiving the data, the one or more first ports 125 copy the data to the media storage device plugged in one of the one or more intermediate ports 127. Upon copying the data to the media storage device, the media storage device is mounted remotely to the embedded system 111 by the one or more second ports 129 through the second communication channel. The one or more second ports 129 transmit the data to the embedded system 111 based on status of each of the plurality of relays 123 associated with each of the one or more second ports 129. The one or more second ports 129 transfer the data to the embedded system 111, when the status of each of the plurality of relays 123 associated with each of the one or more second port 129 is "close" i.e. when each of the plurality of relays 123 associated with each of the one or more second ports 129 are controlled by the controller board 131 in such a way that, the GPIO lines between the one or more second ports 129 and the embedded system 111 are closed. But simultaneously, the GPIO lines between the automation system 101 and the one or more first ports 125 are open. The data is transmitted through the second communication channel.

Upon transmitting the data, the controller board 131 executes one or more automation scripts received from the automation system 101. The execution of the one or more automation scripts facilitate access of a Human Machine Interface (HMI) 117 and one or more configuration menus 119, configured in the embedded system 111, to the automation system 101. Further, the data is authenticated through the access of the HMI 117 of the embedded system 111. Upon authentication of the data, the automation system 101 performs the one or more operations automatically in the embedded system 111 through the HMI 117 and the one or more configuration menus 119.

While performing the one or more operations, the automation system 101 monitors the one or more operations until their completion to ensure the fail-safe performance of the one or more operations. If the one or more operations are performed successfully, the automation system 101 traverses out of the one or more configuration menus 119. Upon traversing out of the one or more configuration menus 119, the media storage device is remotely un-mounted from the embedded system 111 by the one or more second ports 129 through the second communication channel. Further, the automation system 101 initiates restart of the embedded system 111 through the HMI 117. Upon restarting the embedded system 111, the automation system 101 accesses the latest version in the embedded system 111 to verify the proper functioning of the embedded system 111. If the one or more operations are not performed successfully, the process of initiating the performance of the one or more operations is repeated.

Scenario-1

Consider a scenario where the latest version of an application has to be validated and upgraded in an In-Vehicle Infotainment (IVI) system. The automation system 101 (a laptop installed with the automation tool), polls at a pre-defined time intervals to identify the availability of a latest upgrade for the IVI system. When the latest upgrade for the application is identified, the automation system 101 checks if the latest upgrade is different from the existing upgrade in the IVI system application. If the latest upgrade is different from the existing upgrade, the automation system 101 downloads data/file related to the latest upgrade and stores in its repository. Upon storing the data/file, the automation system 101 transfers the data to an interface switch 109 i.e. a USB switch in this scenario. The interface switch 109 comprises at least one relay board 121 comprising plurality of relays 123, plurality of ports comprising one or more first ports 125, one or more intermediate ports 127 and one or more second ports 129, and a controller board 131. The automation system 101 transfers the data based on status of each of the plurality of relays 123 associated with each of the one or more first ports 125. In an embodiment, the status of each of the plurality of relays 123 is at least one of "open" and "close". The automation system 101 transfers the data to the interface switch 109 when the status of each of the plurality of relays 123 associated with each of the one or more first ports 125 is "close". The status of each of the plurality of relays 123 associated with each of the one or more first ports 125 is said to be "close" when each of the plurality of relays 123 associated with each of the one or more first ports 125 are controlled by the controller board 131 in such a way that, GPIO lines, configured in the controller board 131, between the automation system 101 and the one or more first ports 125 are closed. But at the same time, the GPIO lines between the one or more second ports 129 and the embedded system 111 are open. When the GPIO lines are closed between the automation system 101 and the one or more first ports 125, the automation system 101 transfers the data related to the latest upgrade to the interface switch 109. The one or more first ports 125 in the interface switch 109 receive the data through the first communication channel. Upon receiving the data, the data is copied by the one or more first ports 125 to the Universal Serial Bus (USB) device plugged in one of the one or more intermediate ports 127 of the plurality of ports. Upon copying the data, the one or more second ports 129 of the plurality of ports remotely mount the USB device to the IVI system through the second communication channel. The one or more second ports 129 transmit the data to the IVI system when the GPIO lines between the one or more second ports 129 and the IVI system are closed but the GPIO lines between the one or more first ports 125 and the automation system 101 are open. Upon transmitting the data, the controller board 131 executes one or more automation scripts received from the automation system 101. The execution of the one or more automation scripts, facilitate the access of the HMI 117 and the one or more configuration menus 119 to the automation system 101. Further, the data is authenticated through the access of the HMI 117 of the embedded system 111. Upon authentication of the data, the IVI system application is automatically upgraded with the latest upgrade. The process of upgrading the IVI system application with the latest upgrade is monitored to ensure the fail-safe operation. After upgrading the IVI system application with the latest upgrade, the automation system 101 checks whether the process of upgrading was a success. If the process was a success, the automation system 101 closes the one or more configuration menus 119. Further, the USB device is un-mounted remotely by the one or more second ports 129 through the second communication channel. Upon un-mounting, the automation system 101 restarts the IVI system application with the latest upgrade and verifies proper functionality of the IVI system application.

Scenario-2

Consider a scenario where media related testing is being performed on the IVI system. The media related testing may include, but not limited to, media device insertion and eject, time taken to index the media files and list them on the IVI HMI, time taken to render the first media file on the IVI system, trick play controls for the media playback and metadata verification for the media files. The automation system 101 (a laptop installed with the automation tool), copies the media related files and stores in its repository. Upon storing the media related files, the automation system 101 transfers the data to an interface switch 109 i.e. a USB switch in this scenario. The interface switch 109 comprises at least one relay board 121 comprising plurality of relays 123, plurality of ports comprising one or more first ports 125, one or more intermediate ports 127, and one or more second ports 129 and a controller board 131. The automation system 101 transfers the media related files based on status of each of the plurality of relays 123 associated with each of the one or more first ports 125. In an embodiment, the status of each of the plurality of relays 123 is at least one of "open" and "close". The automation system 101 transfers the media related files to the interface switch 109 when the status of each of the plurality of relays 123 associated with each of the one or more first ports 125 is "close". The status of each of the plurality of relays 123 associated with each of the one or more first ports 125 is said to be "close" when each of the plurality of relays 123 associated with each of the one or more first ports 125 are controlled by the controller board 131 in such a way that, GPIO lines, configured in the controller board 131, between the automation system 101 and the one or more first ports 125 are closed. But at the same time, the GPIO lines between the one or more second ports 129 and the embedded system 111 are open. Further, the media related files are transferred to the interface switch 109 when the GPIO lines are closed between the automation system 101 and the one or more first ports 125. The one or more first ports 125 in the interface switch 109 receive the media related files through the first communication channel. Upon receiving the media related files, the media related files are copied by the one or more first ports 125 to the USB device plugged in one of the one or more intermediate ports 127 of the plurality of ports. Upon copying the media related files, the one or more second ports 129 remotely mount the USB device to the IVI system through the second communication channel. The one or more second ports 129 transmit the data to the IVI system when the GPIO lines between the one or more second ports 129 and the IVI system are closed but the GPIO lines between the one or more first ports 125 and the automation system 101 are open. Upon transmitting the media related files, the controller board 131 executes one or more automation scripts received from the automation system 101. The execution of the one or more automation scripts, facilitate the access of the HMI 117 and the one or more configuration menus 119 to the automation system 101. Further, the data is authenticated through the access of the HMI 117 of the embedded system 111. Upon authentication of the data, the automation system 101 waits for the detection of the USB device and the list of the associated media files. Upon accessing the media files listed, the automation system 101 verifies playback of the media files. Further, the automation system 101 verifies the time taken to index the media files and the latency involved in the process of playback of the media files. Further, the automation system 101 verifies the media playback controls like play, pause, resume etc. Finally, metadata related to the media files is read and the correctness of the metadata is verified. After performing all these operations, the USB device is un-mounted remotely and the automation system 101 verifies if the USB device is un-mounted correctly. The automation system 101 restarts the IVI system and checks for the functionality.

Figure 2:
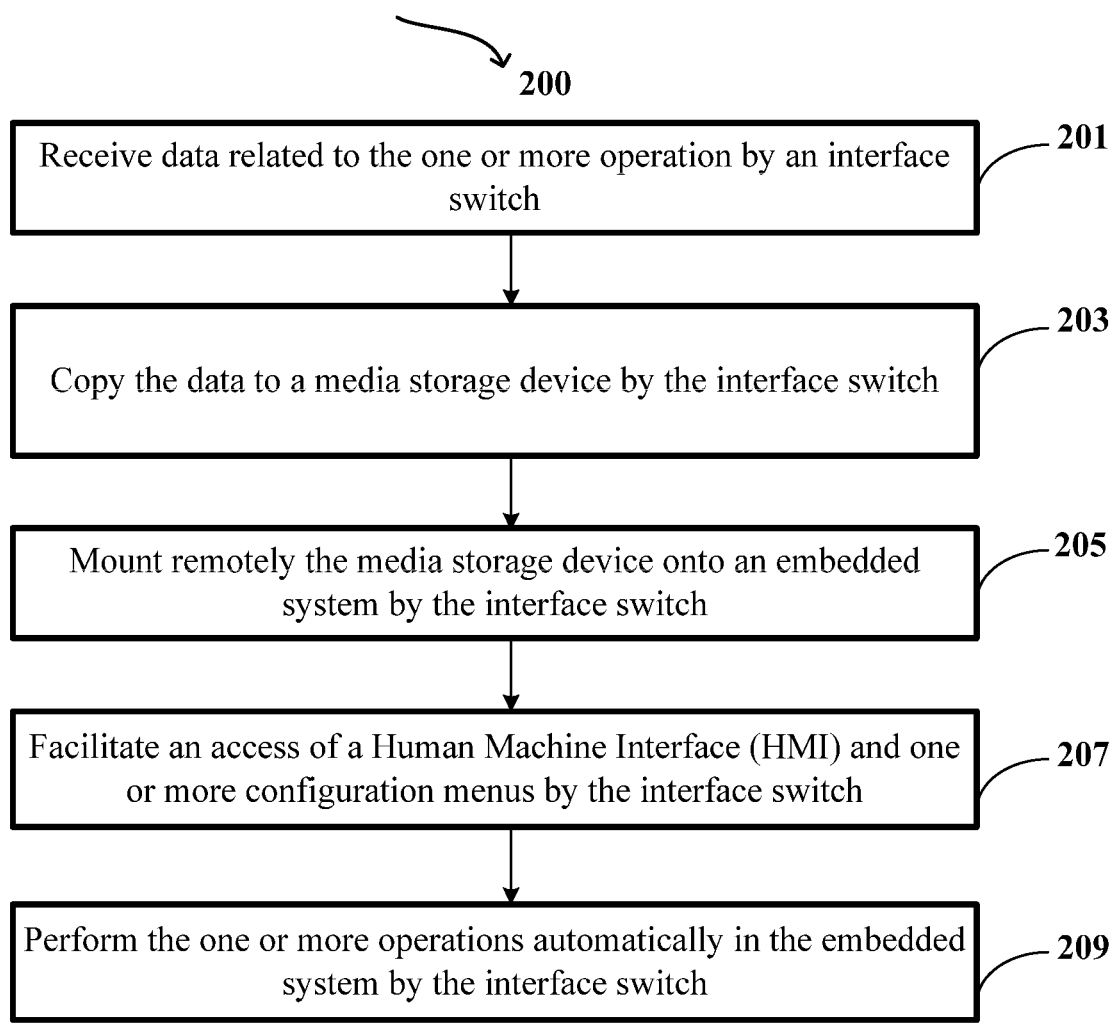
FIG. 2 illustrates a flowchart for automatically performing one or more operations in an embedded system, in accordance with some embodiments of the present disclosure.

FIG. 2 illustrates a flowchart for automatically performing one or more operations in an embedded system, in accordance with some embodiments of the present disclosure.

As illustrated in FIG. 2, the method 200 comprises one or more blocks illustrating a method for automatically performing one or more operations in an embedded system 111. The method 200 may be described in the general context of computer executable instructions. Generally, computer executable instructions can include routines, programs, objects, components, data structures, procedures, modules, and functions, which perform particular functions or implement particular abstract data types.

The order in which the method 200 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof At block 201, data related to the one or more operations is received by an interface switch 109. In an embodiment, an automation system 101 downloads the latest version comprising data related to the one or more operations and stores the data in a memory 105 configured in the automation system 101.

At block 203, the data is copied to a media storage device. In an embodiment, the automation system 101 transfers the data to the interface switch 109 built based on plurality of relays 123 present in at least one relay board 121 configured in the interface switch 109. One or more first ports 125 of the plurality of ports configured in the interface switch 109 receive the data using a first communication channel. Upon receiving the data, the one or more first ports 125 copy the data to the media storage device plugged in one of one or more intermediate ports 127 of the plurality of ports.

At block 205, the media storage device is mounted onto the embedded system 111. In an embodiment, one or more second ports 125 of the plurality of ports mount the media storage device remotely to the embedded system 111 through a second communication channel. Upon mounting the media storage device onto the embedded system 111, the one or more second ports 129 transmit the data to the embedded system 111 based on status of each of the plurality of relays 123 associated with each of the one or more second ports 129. The one or more second ports 129 transfer the data to the embedded system 111, when the status of each of the plurality of relays 123 associated with each of the one or more second ports 129 is "close" i.e. when each of the plurality of relays 123 associated with each of the one or more second ports 129 is controlled by the controller board 131 in such a way that, the GPIO lines between the one or more second ports 129 and the embedded system 111 are closed. But simultaneously, the GPIO lines between the automation system 101 and the one or more first ports 125 are open. The data is transmitted through the first communication channel.

At block 207, an access of a Human Machine Interface (HMI) 117 and one or more configuration menus 119 is facilitated. In an embodiment, upon transmitting the data, a controller board 131 of the interface switch 109 executes one or more automation scripts received from the automation system 101. The execution of the one or more automation scripts, facilitate access of the HMI 117 and one or more configuration menus 119 present in the HMI 117 to the automation system 101. Further, the data is authenticated through the access of the HMI 117 of the embedded system 111. At block 209, the one or more operations are performed automatically on the embedded system 111. In an embodiment, upon authentication of the data, the automation system 101 initiates process of performing the one or more operations automatically in the embedded system 111 through the HMI 117 and the one or more configuration menus 119. While performing the one or more operations, the automation system 101 monitors the one or more operations until their completion to ensure the fail-safe performance of the one or more operations. Further, the automation system 101 verifies if the one or more operations are performed successfully or not. If the one or more operations are performed successfully, the automation system 101 traverses out of the one or more configuration menus 119 i.e. the one or more configuration menus 119 are closed. Upon closing the one or more configuration menus 119, the media storage device is remotely un-mounted from the embedded system 111 by the one or more second ports 129 through the second communication channel. Further, the automation system 101 initiates restart of the embedded system 111 through the HMI 117. Upon restarting the embedded system 111, the automation system 101 accesses the latest version in the embedded system 111 through the HMI 117 to verify the proper functioning of the embedded system 111. If the one or more operations are not performed successfully, the process of initiating the performance of the one or more operations is repeated.

Advantages of the embodiment of the present disclosure are illustrated herein.

In an embodiment, the present disclosure provides an interface switch and a method for automatically performing one or more operations in an embedded system.

The present disclosure provides a feature wherein data associated with the one or more operations such as upgrading software, media testing etc. can be transmitted to an embedded system remotely by mounting a media storage device onto the embedded system.

The present disclosure provides a feature wherein the interface switch or the USB switch is external to the embedded system. As the interface switch is external to the embedded switch, a number of ports on the interface switch may be scaled up depending on the one or more operations to be performed on the embedded system.

The present disclosure provides a feature wherein operations such as software upgrading and media testing etc. may be performed automatically and quickly on the embedded system. Therefore, the present disclosure accelerates the development life cycle and testing cycles.

The present disclosure provides a feature wherein the manual intervention is minimum starting from downloading the release of latest software upgrade to verifying and validating the latest software upgrades.

The present disclosure provides a feature wherein the latest upgrades and software applications may be validated from a remote location, which in turn helps in achieving stable baseline references. Also, a lot of time is saved for the developers and testers of software applications.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself The specification has described an interface switch and a method for automatically performing one or more operations in an embedded system. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of this technology are intended to be illustrative, but not limiting, of the scope of the invention, which is set forth in the following claims.

What is claimed is:

1. An interface switch, comprising:
a plurality of ports, wherein:
   one or more first ports of the plurality of ports comprise input ports configured to establish a first communication channel with an automation system and receive data related to one or more operations from the automation system through the first communication channel;
   one or more intermediate ports of the plurality of ports are interfaced with the one or more first ports, each of the one or more intermediate ports configured to couple a media storage device for storing the data;
   one or more second ports of the plurality of ports comprise output ports configured to establish a second communication channel with an embedded system and transmit the data to the embedded system through the second communication channel for performing the one or more operations in the embedded system, wherein the one or more second ports are configured to establish the second communication channel for performing operations of mounting and un-mounting remotely the media storage device with the embedded system, and wherein the operations of the mounting and un-mounting the media storage device are based on a status of each of the plurality of relays associated with each of the one or more secondary ports, wherein the status of each of the plurality of relays is at least one of "open" or "close";
at least one relay board comprising a plurality of relays, wherein each of the relays is associated with one or more of the plurality of ports; and
a controller board configured to control operations of the plurality of ports through switching of the relays and facilitate access of a Human Machine Interface (HMI) and one or more configuration menus of the embedded system to the automation system by executing one or more automation scripts.

2. The interface switch as claimed in claim 1, wherein the one or more first ports are configured to receive the data from the automation system through the first communication channel upon detecting the "close" status of each of the plurality of relays associated with each of the one or more first ports and "open" status of each of the plurality of relays associated with each of the one or more second ports.

3. The interface switch as claimed in claim 2, wherein the one or more second ports are configured to transmit the data to the embedded system through the second communication channel upon detecting the "close" status of each of the plurality of relays associated with each of the one or more second ports and "open" status of each of the plurality of relays associated with each of the one or more first ports.

4. The interface switch as claimed in claim 1, wherein the one or more operations comprise upgrading or testing one or more applications in the embedded system.

5. A method for automatically performing operations in an embedded system, the method comprising:
receiving, by an interface switch, data related to one or more operations from an automation system;
copying, by the interface switch, the data to a media storage device configured in the interface switch;

remotely mounting, by the interface switch, the media storage device onto the embedded system;

facilitating, by the interface switch, access of a Human Machine Interface (HMI) and one or more configuration menus of the embedded system to the automation system;

performing, by the interface switch, the one or more operations automatically in the embedded system using the HMI and the one or more configuration menus; and un-mounting, by the interface switch, the media storage device from the embedded system upon completion of the one or more operations, wherein the mounting and un-mounting of the media storage device is controlled based on a status of each of plurality of relays of a relay board, and wherein the status of each of the plurality of relays is at least one of "open" or "close".

6. The method as claimed in claim 5, wherein the one or more operations comprise upgrading or testing one or more applications in the embedded system.

7. The method as claimed in claim 5, further comprising authenticating, by the interface switch, the data in the media storage device through the access of HMI of the embedded system.

8. The method as claimed in claim 5, further comprising executing, by the interface switch, one or more automation scripts received from the automation system to facilitate access of the HMI and the one or more configuration menus.

9. A non-transitory computer readable medium having stored thereon instructions for automatically performing operations in an embedded system comprising executable code which when executed by one or more processors, causes the processors to:

receive data related to one or more operations from an automation system;

copy the data to a media storage device configured in the interface switch;

remotely mount the media storage device onto the embedded system;

facilitate access of a Human Machine Interface (HMI) and one or more configuration menus of the embedded system to the automation system;

perform the one or more operations automatically in the embedded system using the HMI and the one or more configuration menus; and un-mount the media storage device from the embedded system upon completion of the one or more operations, wherein the mounting and un-mounting of the media storage device is controlled based on a status of each of plurality of relays of a relay board, and wherein the status of each of the plurality of relays is at least one of "open" or "close".

10. The non-transitory computer readable medium as claimed in claim 9, wherein the one or more operations comprise upgrading or testing one or more applications in the embedded system.

11. The non-transitory computer readable medium as claimed in claim 9, wherein the executable code when executed by the processors further causes the processors to authenticate the data in the media storage device through the access of HMI of the embedded system.

12. The non-transitory computer readable medium as claimed in claim 9, wherein the executable code when executed by the processors further causes the processors to execute one or more automation scripts received from the automation system to facilitate access of the HMI and the one or more configuration menus.

* * * * *